United States Patent
Chiu et al.

(10) Patent No.: US 9,326,148 B2
(45) Date of Patent: Apr. 26, 2016

(54) DISPLAY APPARATUS AND AUTHORIZING METHOD THEREOF

(71) Applicant: Wistron Corporation, New Taipei (TW)

(72) Inventors: Yu-Wei Chiu, New Taipei (TW); Chih-Hong Chu, New Taipei (TW)

(73) Assignee: Wistron Corporation, Taipei (TW)

( * ) Notice: Subject to any disclaimer, the term of this patent is extended or adjusted under 35 U.S.C. 154(b) by 0 days.

(21) Appl. No.: 14/481,921

(22) Filed: Sep. 10, 2014

(65) Prior Publication Data

US 2015/0327070 A1 Nov. 12, 2015

(30) Foreign Application Priority Data

May 12, 2014 (TW) .............................. 103116733 A (51) Int. Cl.
*H04M 1/66* (2006.01)
*H04W 12/08* (2009.01)
*H04W 48/02* (2009.01)
*G06F 1/16* (2006.01)
*H04W 4/00* (2009.01)

(52) U.S. Cl.
CPC ............. *H04W 12/08* (2013.01); *G06F 1/1698* (2013.01); *H04W 4/008* (2013.01); *H04W 48/02* (2013.01)

(58) Field of Classification Search
None
See application file for complete search history.

(56) References Cited

U.S. PATENT DOCUMENTS

| | | | |
|---|---|---|---|
| 2007/0176780 | A1 | 8/2007 | Hart |
| 2012/0069273 | A1* | 3/2012 | Watanabe ..................... 349/64 |
| 2012/0092294 | A1 | 4/2012 | Ganapathi et al. |
| 2013/0107144 | A1 | 5/2013 | Marhefka et al. |
| 2013/0243266 | A1 | 9/2013 | Lazzouni |
| 2014/0087656 | A1 | 3/2014 | Boelter et al. |
| 2014/0325554 | A1* | 10/2014 | Park et al. ..................... 725/31 |
| 2015/0015512 | A1* | 1/2015 | Kwak et al. ................... 345/173 |

OTHER PUBLICATIONS

"Office Action of Taiwan Counterpart Application", issued on Jul. 30, 2015, with English translation thereof, p. 1-p. 8, in which the listed references were cited.

* cited by examiner

*Primary Examiner* — Adolf Dsouza
(74) *Attorney, Agent, or Firm* — Jianq Chyun IP Office (57) ABSTRACT

A display apparatus and an authorizing method thereof are provided. The display apparatus includes a display panel and at least one wireless communication module disposed behind the display panel. In the method, a frame is displayed on the display panel, and the at least one wireless communication module is used to communicate with the wireless communication apparatus so as to obtain authorization data. Each of the at least one wireless communication module is operated at a working frequency capable of penetrating through the display panel to communicate with the wireless communication apparatus. An authorization process related to a content of the frame is executed by using the received authorization data.

12 Claims, 8 Drawing Sheets

DISPLAY APPARATUS AND AUTHORIZING METHOD THEREOF

CROSS-REFERENCE TO RELATED APPLICATION

This application claims the priority benefit of Taiwan application serial no. 103116733, filed on May 12, 2014. The entirety of the above-mentioned patent application is hereby incorporated by reference herein and made a part of this specification.

BACKGROUND

1. Field of the Invention

The invention relates to a display apparatus and an authorizing method thereof. More particularly, the invention relates to an apparatus and a method for authorization by utilizing wireless communication technique capable of penetrating through a display panel.

2. Description of Related Art

As the display technology advances, liquid crystal displays (LCDs) nowadays have the advantages of low power consumption, slimness, compactness, high resolution, high color saturation, long life span, and so forth. Therefore, the LCDs have replaced the conventional cathode ray tube (CRT) displays and are broadly used in various electronic products having a display function. In our daily life, the LCDs may be used in electronic apparatuses such as computer screens, televisions, and cameras. When it comes to teaching, the LCDs may be used in electronic whiteboards.

The electronic whiteboards provide the teacher with a tool convenient for writing and teaching and are equipped with a touch screen for sensing a touch of a stylus held by the teacher. Based on a trace of the touch, a corresponding pattern may be drawn on the touch screen.

However, current electronic whiteboards or other displays equipped with the touch screen merely provide display and touch operating functions, without any convenient authorization and authentication mechanism. As a result, when the user operates certain function requiring authorization, the user has to manually input authorization data, such as an account or a password for authorization, which causes much inconvenience to the user. Moreover, in a scenario where no authorization and authentication mechanism is set, any person may operate the display, which leads to data leakage from the display easily.

SUMMARY

The invention provides a display apparatus and an authorizing method therefor, in which a reader or an electronic tag disposed behind a display panel may communicate with a wireless communication apparatus located in front of the display panel by utilizing a penetrating effect of an electromagnetic signal, so as to provide a user with a contact-free and convenient authorization and authentication mechanism.

The invention provides a display apparatus, which includes a display panel, at least one first wireless communication module and a processor. The display panel is configured to display a frame. The at least one first wireless communication module is disposed behind the display panel, and each of the at least one first wireless communication module is operated at a working frequency capable of penetrating through the display panel to communicate with the wireless communication apparatus in front of the display panel. The processor is coupled to the display panel and the at least one first wireless communication module and is configured to communicate with the wireless communication apparatus to obtain authentication data by using the at least one first wireless communication module and execute an authorization process related to a content of the frame by using the authorization data.

In an embodiment of the invention, each of the at least one first wireless communication module is a near field communication (NFC) transceiver, a radio frequency identification (RFID) tag reader or an active RFID tag. Each of the at least one first wireless communication module sends an inquiry signal and receives the authorization data returned by the wireless communication apparatus in response to the inquiry signal.

In an embodiment of the invention, the at least one first wireless communication module is disposed behind a plurality of regions of the display panel and configured to communicate with the wireless communication apparatus in front of each of the regions. The processor displays a plurality of regional frames on the regions of the display panel and based on the regions where the first wireless communication module communicating with the wireless communication apparatus is located, executes the authorization process related to the content of the frame by using the authorization data.

In an embodiment of the invention, each of the at least one first wireless communication module is a passive RFID tag and configured to receive an inquiry signal sent by the wireless communication apparatus and return identification data to the wireless communication apparatus in response to the inquiry signal.

In an embodiment of the invention, the display apparatus further includes a second wireless communication module. The second wireless communication module is coupled to the processor and configured to receive the identification data and the authorization data sent by the wireless communication apparatus. The processor determines the region where the first wireless communication module communicating with the wireless communication apparatus is located according to the identification data and executes the authorization process related to the content of the frame by using the authorization data.

In an embodiment of the invention, the display apparatus further includes a network connection module. The network connection module is coupled to the processor and configured to connect with a server through a network and send the authorization data to the server for authorization.

The invention provides an authorizing method adapted for a display apparatus including a display panel and at least one first wireless communication module disposed behind the display panel. In the method, a frame is displayed on the display panel, and a wireless communication apparatus located in front of the display panel is communicated to obtain authorization data by using the at least one first wireless communication module, in which each of the at least one first wireless communication module is operated at a working frequency capable of penetrating through the display panel to communicate with the wireless communication apparatus. An authorization process related to a content of the frame is executed by using the authorization data.

In an embodiment of the invention, each of the at least one first wireless communication module is an NFC transceiver, an RFID tag reader or an active RFID tag and the step of communicating with the wireless communication apparatus located in front of the display panel to obtain the authorization data by using the at least one first wireless communication module includes sending an inquiry signal by using the at least one first wireless communication module and receiving the authorization data returned by the wireless communication apparatus in response to the inquiry signal.

In an embodiment of the invention, each of the at least one first wireless communication module is disposed behind a plurality of regions of the display panel, and the step of executing the authorization process related to the content of the frame by using the authorization data includes based on the regions where the first wireless communication module communicating with the wireless communication apparatus is located, executing the authorization process related to the content of the frame by using the authorization data.

In an embodiment of the invention, each of the at least one wireless communication module is a passive RFID tag, and the step of communicating with the wireless communication apparatus to obtain the authorization data by using the at least one first wireless communication module further includes receiving the inquiry signal sent by the wireless communication apparatus by using the at least one first wireless communication module and returning identification data of the first wireless communication module which receives the inquiry signal to the wireless communication apparatus according to the inquiry signal.

In an embodiment of the invention, the step of executing the authorization process related to the content of the frame by using the authorization data includes receiving the identification data and the authorization data sent by the wireless communication apparatus by using a second wireless communication module, determining the region where the first wireless communication module communicating with the wireless communication apparatus is located according to the identification data and executing the authorization process related to the content of the frame of the region by using the authorization data.

In an embodiment of the invention, the step of executing the authorization process related to the content of the frame by using the authorization data includes connecting with a server through a network and sending the authorization data to the server for authorization.

In an embodiment of the invention, the working frequency is 13.56 megahertz (MHz).

To sum up, in the display apparatus and the authorizing method thereof of the invention, at least one wireless communication module is disposed behind the display panel and is operated at a specific working frequency to communicate with the wireless communication apparatus located in front of the display panel to obtain the authorization data by utilizing the penetrating effect of an electromagnetic wave at the working frequency, so as to execute the authorization process related the displayed frame. Thereby, the user can be provided with a convenient authorization and authentication mechanism.

To make the above features and advantages of the invention more comprehensible, embodiments accompanied with drawings are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF EMBODIMENTS

Due to a shielding effect resulted from a metal layer inside a display panel of a display apparatus, most radio electromagnetic waves cannot penetrate through the display panel, but only a part of electromagnetic waves has a penetrating effect and is able to penetrate through the display panel. Accordingly, in the invention, at least one wireless communication module is disposed behind a display panel and operated at a working frequency having the penetrating effect so as to communicate with a wireless communication apparatus in front of the display panel. In this way, authorization data may be obtained through wireless transmission, and an authorization process with an external server and related to a content of a frame displayed by the display panel may be performed through a network. Thereby, the display apparatus can provide not only a drawing and writing function, but also a secure authorization and certification function.

Figure 1:
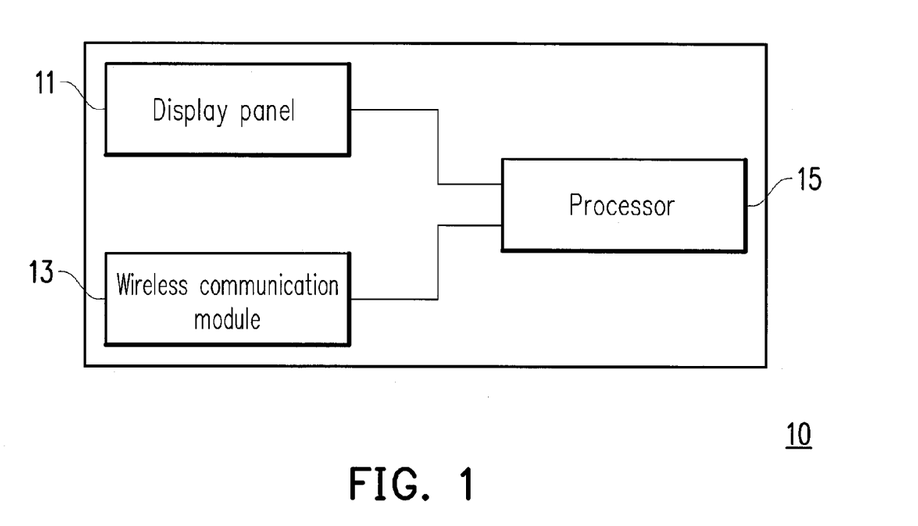
FIG. 1 is a block diagram illustrating a display apparatus according to an embodiment of the invention.

FIG. 1 is a block diagram illustrating a display apparatus according to an embodiment of the invention. With reference to FIG. 1, a display apparatus 10 of the present embodiment is, for example, a liquid crystal display (LCD), a light-emitting diode (LED) display, a field emission display (FED) or any other type of display apparatus. The display apparatus 10 is used as, for example, a computer display, a television, a tablet computer or an electronic whiteboard, but the embodiment is not limited thereto. The display apparatus 10 includes a display panel 11, a wireless communication module 13 and a processor 15, and functions thereof are described as follows.

The display panel 11 is a display panel of, for example, an LCD, an LED display, an FED or any other type of display apparatus and is capable of displaying frames. The display panel 11 may be combined with a resistive or a capacitive touch panel to form a touch display panel and provide a display function and a touch operation function at the same time.

The wireless communication module 13 is a near field wireless communication apparatus, such as a near field communication (NFC) transceiver, a radio frequency identification (RFID) tag reader or an active RFID tag. The wireless communication module 13 is disposed, for example, behind the display panel 11 and operated at a working frequency capable of penetrating through the display panel 11 to communicate with a wireless communication apparatus in front of the display panel 11. It should be mentioned that the working frequency at which the wireless communication module 13 is operated ranges, for example, from 13 to 14 megahertz (MHz). In the present embodiment, the working frequency used by the wireless communication module 13 is 13.56 MHz. In other embodiments, the wireless communication module 13 may penetrate through the display panel 11 by using other working frequencies, which depends on the type and characteristics of the display panel 11 and is not limited in the embodiment. Additionally, the wireless communication module 13 may be disposed behind the display panel 11 and built in a casing of the display apparatus 10 (e.g., embedded in a circuit board of the display panel 11) or plug-in outside the casing of the display apparatus 10, which depends on the design demands, and is not limited in the embodiment.

The processor 15 is, for example, a central processing unit (CPU) or any other programmable microprocessor for general purpose or special purpose, such as a digital signal processor (DSP), a programmable controller, an application specific integrated circuit (ASIC), or other similar devices, or a combination of these devices. The processor is coupled to the display panel 11 and the wireless communication module 13, and is configured to control the display panel 11 to display a frame and communicate with a wireless communication apparatus (not shown) in front of the display panel 11 through the wireless communication module 13 to obtain authorization data and execute an authorization process according to the authorization data.

Figure 2:
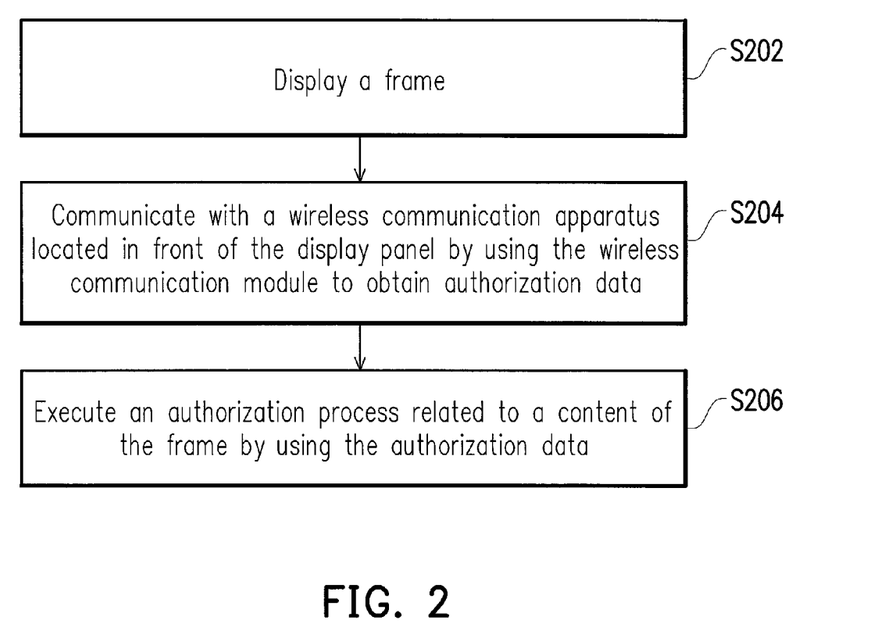
FIG. 2 is a flowchart illustrating an authorizing method for a display apparatus according to an embodiment of the present invention.

In detail, FIG. 2 is a flowchart illustrating an authorizing method for a display apparatus according to an embodiment of the present invention. Referring to FIG. 1 and FIG. 2 together, the method of the present embodiment is applicable to the display apparatus 10, and detailed steps of the method of the present embodiment will be described with reference to each element of the display apparatus 10 depicted in FIG. 1.

In step S202, the processor 15 displays a frame on the display panel 11. The frame may be, for example, a user interface (UI) provided by banking service, payment, information inquiry or shopping businesses and so on. In an embodiment, a user may also operate on the display panel 11 by a stylus or fingers to open and display a frame for each of the aforementioned services for the subsequent authorization process.

In step S204, the processor 15 communicates with the wireless communication apparatus located in front of the display panel 11 through the wireless communication module 13 to obtain authorization data. The wireless communication module 13 is operated at a working frequency capable of penetrating through the display panel 11 for communication. The wireless communication apparatus is, for example, a portable apparatus, such as a smart phone, a tablet computer or the like equipped with a NFC transceiver, an RFID tag reader or an RFID tag. The user may hold the wireless communication apparatus to approach the front of the display panel 11, such that the wireless communication apparatus may communicate with the wireless communication module disposed behind the display panel 11. The wireless communication module 13 may send an electromagnetic signal having a frequency of 13.56 MHz and receive the corresponding authorization data returned by the wireless communication apparatus.

More specifically, the NFC transceiver, the RFID tag reader or the active RFID tag is capable of actively sending a radio-frequency (RF) signal periodically or sending the RF signal in response to the command received from the processor 15. Thus, when the wireless communication apparatus (e.g., the RFID tag) approaches the wireless communication module 13 to be within a specific distance (e.g., 10 cm, 20 cm or the like), the wireless communication module 13 is able to communicate with the wireless communication apparatus. For instance, the wireless communication module 13 actively sends an inquiry signal such as key request or identity recognition. When the wireless communication apparatus approaches the wireless communication module 13, an internal circuit (e.g., an integrated circuit (IC)) of the RFID tag in the wireless communication apparatus is driven upon the receipt of the inquiry signal and returns the corresponding authorization data (e.g., a key or personal information) accordingly. The wireless communication module 13 may then receive the authorization data. It should be mentioned that the wireless communication apparatus also is required to be set at a working frequency corresponding to the working frequency at which the wireless communication module 13 is operated to receive the inquiry signal sent by the wireless communication module 13.

In step S206, the processor 15 executes an authorization process related to a content of the frame by using the authorization data. In the present embodiment, there is only one wireless communication module 13 disposed in the display apparatus 10, and after the processor 15 receives the authorization data provided by the wireless communication apparatus through the wireless communication module 13, the processor 15 can determine the content of the currently displayed frame and accordingly execute the process related to the content of the frame by using the authorization data. For instance, if the display apparatus 10 displays a login window of an Internet banking service, after receiving the authorization data (e.g., an account and a password) provided by the wireless communication apparatus through the wireless communication module 13, the processor 15 may automatically fill the authorization data in corresponding fields in the login window for authorization, and a personalized webpage of the Internet banking service may be entered.

It should be mentioned that in another present embodiment, two or more wireless communication modules (e.g., 2, 4, 6 or any other number of wireless communication modules) may be disposed in the display apparatus 10. The wireless communication modules may be disposed behind a plurality of regions (e.g., 2, 4, 6 or any other number of regions) of the display panel 11. Based on the region where the wireless communication module communicating with the wireless communication apparatus is located, the processor executes the authorization process related to the content of the framed displayed on the region by using the authorization data. In particular, the processor 15 may respectively display different frames on different regions of the display panel 11, in which the frames respectively corresponds to different authorization processes and wireless communication modules are respectively disposed behind the regions. In this way, when any one of the wireless communication modules detects the wireless communication apparatus and receives the authorization data provided thereby, the processor 15 may obtain the region where the wireless communication module receiving the authorization data is located and executes the authorization process related to the content of the frame displayed on the region by using the authorization data. Therein, the processor 15 may perform signal processing (e.g., filtering, interpreting and amplifying) on the signal received by the wireless communication module to obtain the authorization data, but the invention is not limited thereto.

Additionally, in yet another embodiment, the display apparatus 10 further includes a network connection module (not shown). The network connection module is an apparatus complying with wireless communication technique, such as wireless fidelity (Wi-Fi), global system for mobile (GSM) or code division multiple access (CDMA) or complying with wired communication technique, such as asymmetric digital subscriber line (ADSL) or cable modem. The network connection module is coupled to the processor 15 and configured to connect with a server through a network and send the authorization data to the sever for authorization. The server may, for example, decode and/or interpret the authorization data provided by the display apparatus 10, compare the authorization data with data in a database, and finally return an authorization result to the display apparatus 10 through the network to complete the authorization process.

By the method, when the user holds an apparatus having the NFC function to approach the display apparatus 10, the display apparatus 10 may provide an authorization process such as identity recognition, or key interpretation, such that the personal data in the display apparatus 10 can be protected.

It should be mentioned that in above embodiments, each wireless communication module is an NFC transceiver, an RFID tag reader or an active RFID tag and may actively send an RF signal to communicate with the external wireless communication apparatus so as to obtain the authorization data. In another embodiment, each wireless communication module may also be a passive RFID tag, such that the detection, the communication, and the authorization processes are actively executed by the wireless communication apparatus. Another exemplary embodiment is described below for further illustration.

Figure 3:
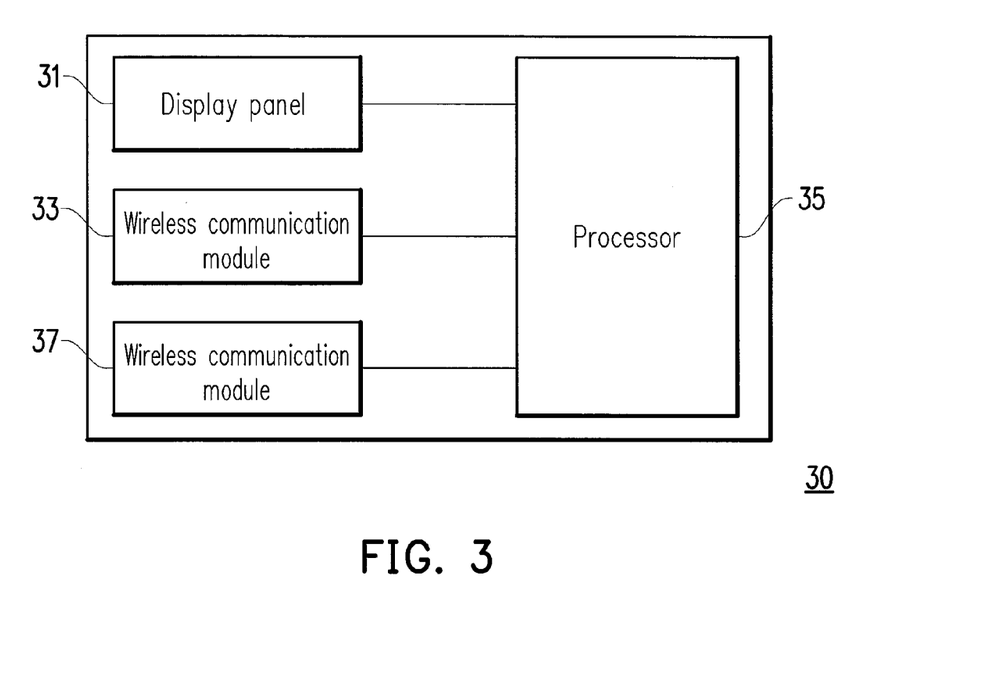
FIG. 3 is a block diagram illustrating a display apparatus according to an embodiment of the invention.

FIG. 3 is a block diagram illustrating a display apparatus according to an embodiment of the invention. With reference to FIG. 3, a display apparatus 30 of the present embodiment is, for example, a liquid crystal display (LCD), a light-emitting diode (LED) display, a field emission display (FED) or any other type of display apparatus. The display apparatus 30 is used as, for example, a computer display, a television, a tablet computer or an electronic whiteboard, but the embodiment is not limited thereto. The display apparatus 30 includes a display panel 31, wireless communication modules 33 and 37 and a processor 35. The types of the display panel 31 and the processor 35 are the same as or similar to the display panel 11 and the processor 15 of the above embodiment, and therefore will not be repeatedly described hereinafter.

Different from the preceding embodiment, in the present embodiment, the wireless communication module 33 disposed behind the display panel 31 is a passive RFID tag which replies to an inquiry signal only when receiving an inquiry signal sent by an external NFC transceiver, a RFID tag reader or an active RFID tag. The passive RFID tag has a lower cost and does not need power and thus, can be widely disposed in a plurality of regions behind the display panel to provide more authorization subjects for the user to choose. However, the passive RFID tag does not actively send any signal and cannot actively obtain the authorization data from the external wireless communication apparatus, and thus, in the present embodiment, a wireless communication module 37 is additionally disposed in the display apparatus 30 to receive the authorization data provided by the external wireless communication apparatus. The wireless communication module 37 complies with the wireless communication technique, such as Wi-Fi, NFC, Bluetooth, or device to device (D2D) communication. An authorizing method for the display apparatus 30 is described in detail below.

Figure 4:
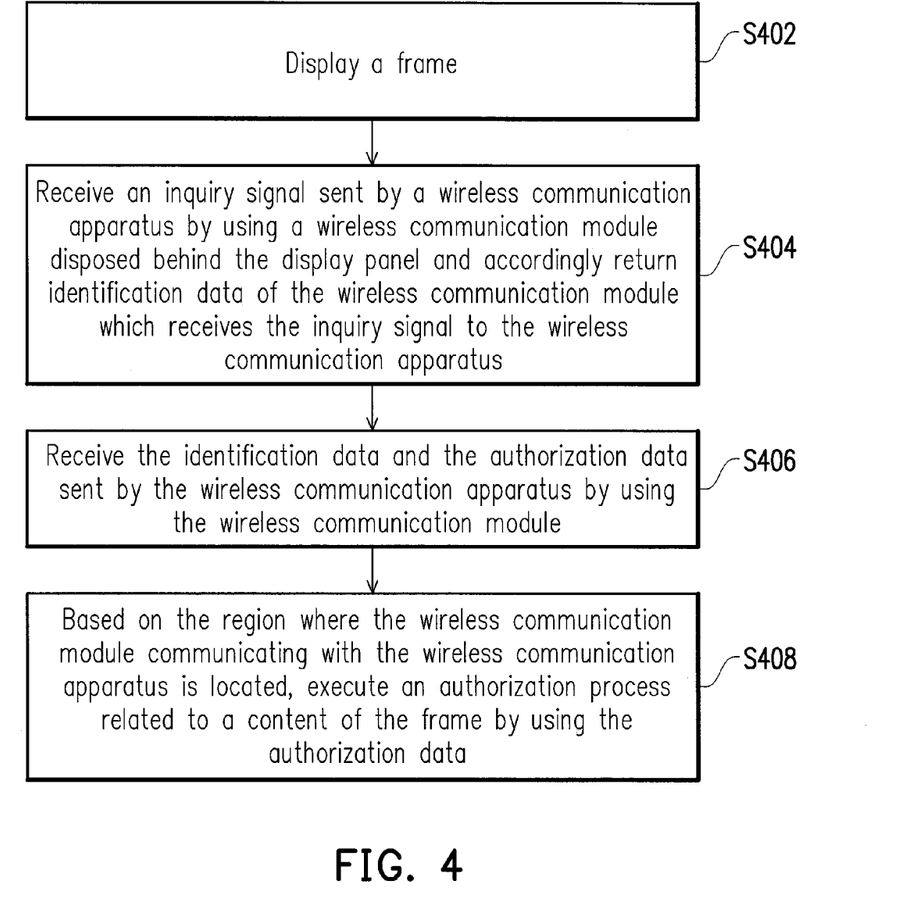
FIG. 4 is a flowchart illustrating an authorizing method for a display apparatus according to an embodiment of the present invention.

FIG. 4 is a flowchart illustrating an authorizing method for a display apparatus according to an embodiment of the present invention. Referring to FIG. 3 and FIG. 4 together, the method of the present embodiment is adapted for the display apparatus 30, and detailed steps of the method of the present embodiment will be described with reference to each element of the display apparatus 30 depicted in FIG. 3. Step S402 is the same as or similar to step S202 in the previous embodiment and thus, will not be repeated herein.

Different from the embodiment illustrated in FIG. 2, in the present embodiment, the processor 35 receives the inquiry signal sent by the wireless communication apparatus through the wireless communication module 33 disposed behind the display panel 31 and accordingly returns identification data of the wireless communication module 33 receiving the inquiry signal to the wireless communication apparatus (step S404).

More specifically, when receiving the inquiry signal sent by the wireless communication apparatus in front of the display panel 31, electricity is induced to drive the wireless communication module 33 to send identification data (e.g., an identification (ID) of the wireless communication module 33) to the wireless communication apparatus. After receiving the identification data, the wireless communication apparatus sends the identification data together with the authorization data to the display apparatus 30.

In detail, the processor 35 of the display apparatus 30 receives the identification data and the authorization data sent by the wireless communication apparatus by using the wireless communication module 37 (step S406). In particular, after receiving the identification data, the wireless communication apparatus may communicates with the wireless communication module 37 of the display apparatus 30 to send the identification data together with the authorization data to the display apparatus 30.

It should be mentioned that the aforementioned communication is, for example, established in advance between the wireless communication apparatus and the wireless communication module 37 or actively established after the wireless communication apparatus receives the identification data, which is not limited in the embodiment. More specifically, in an embodiment, the display apparatus 30 executes an authentication or a paring process with the wireless communication apparatus by using the wireless communication technique (e.g., Wi-Fi direct, Bluetooth, or NFC) supported by the wireless communication module 37 to establish a channel for signal transmission. For example, the identification data sent by the wireless communication module 33 includes an IP address and a media access control (MAC) address of the wireless communication module 37. The wireless communication apparatus may then establish Wi-Fi connection with the wireless communication module. After the paring process, the display apparatus 30 and the wireless communication apparatus send a wireless signal through the channel to obtain the authorization data.

In step S408, the processor 35 determines a region where the wireless communication module 33 communicating with the wireless communication apparatus is located according to the identification data and executes the authorization process related to the content of the frame displayed on the region by using the authorization data. In particular, the processor 35 may, for example, determine the wireless communication module 33 in the display apparatus 30 from which the wireless communication apparatus receives the identification data based on the ID contained in the identification data and accordingly determine a location of the wireless communication module 33 and the region corresponding to the location on the display panel. Thereby, the processor 35 may executes the authorization process related to the content of the frame displayed on the region based on the received authorization data.

Through the method, the display apparatus 300 may be disposed with the passive RFID tag which is relatively cheap to save the cost of the display apparatus 30 while keep providing the service for wireless security certification.

Figure 5:
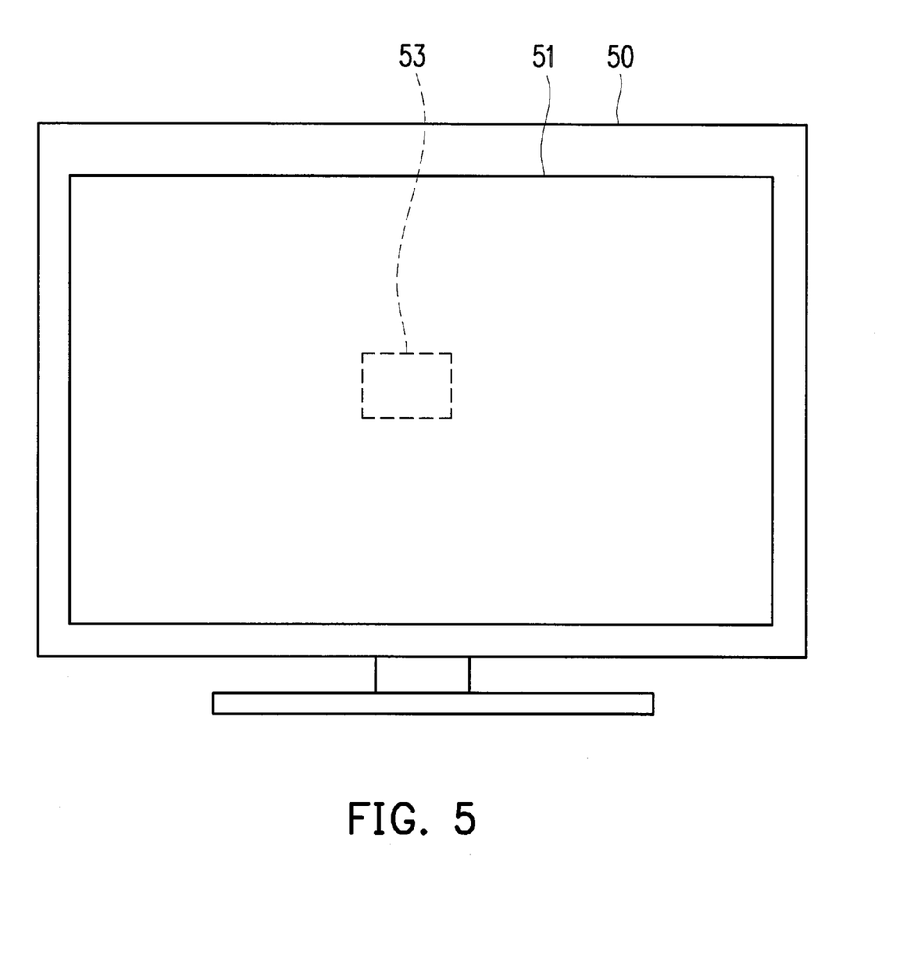
FIG. 5 is a schematic diagram illustrating a display apparatus according to an embodiment of the invention.

FIG. 5 is a schematic diagram illustrating a display apparatus according to an embodiment of the invention. With reference to FIG. 5, a display apparatus 50 includes a display panel 51 and a wireless communication module 53. The wireless communication module 53 is disposed behind the display panel 51 and is an NFC transceiver. In an embodiment, the user may operate on the display panel 51 to select a desired authorization service. When the user holds a smart phone with an NFC transceiver to approach the wireless communication module 53 (e.g., for 0 cm to 10 cm), the wireless communication module 53 may communicate with the smart phone to obtain an electronic key, such that the display apparatus 50 may execute an authorization process for key decryption and authentication according to the electronic key. In the present embodiment, the display apparatus 50 is equipped with only one wireless communication module 53. Thus, the display apparatus only has to provide an authorization process corresponding to a content that is currently displayed. In other embodiments, the display apparatus 50 may be equipped a plurality of wireless communication modules corresponding to different authorization processes. Another example is illustrated below for description.

Figure 6A:
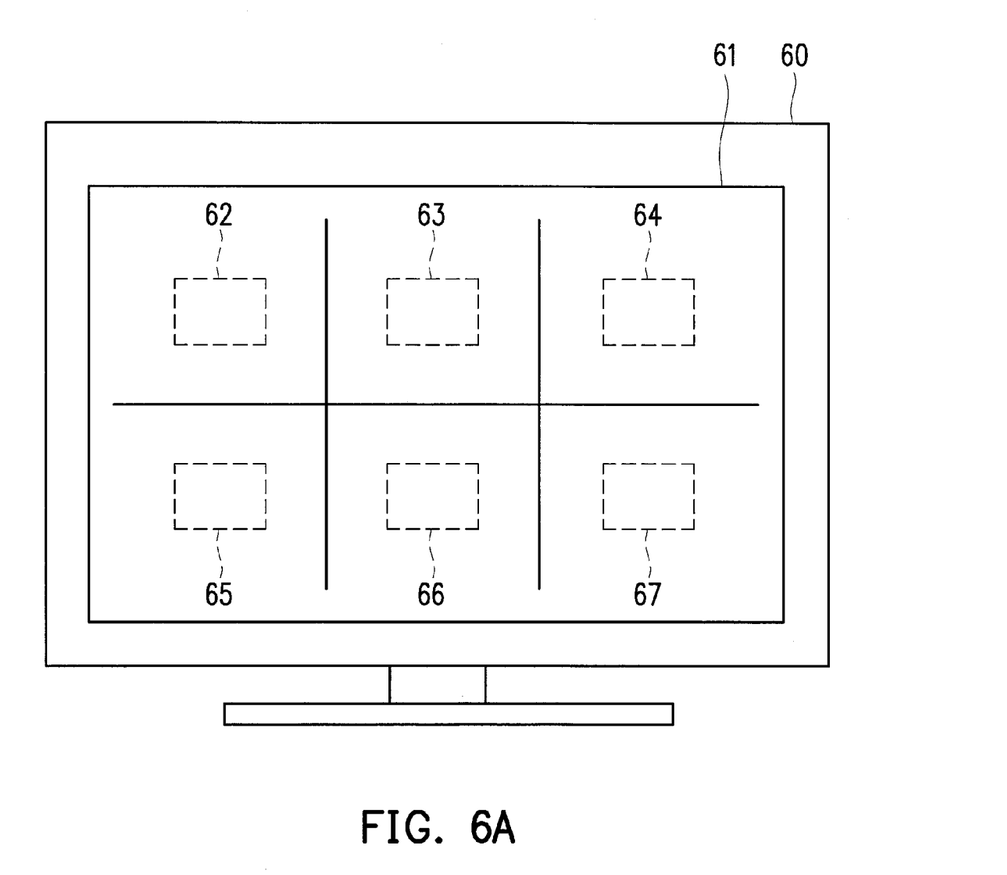
FIG. 6A and FIG. 6B are schematic diagrams illustrating a display apparatus according to an embodiment of the invention.
Figure 6B:
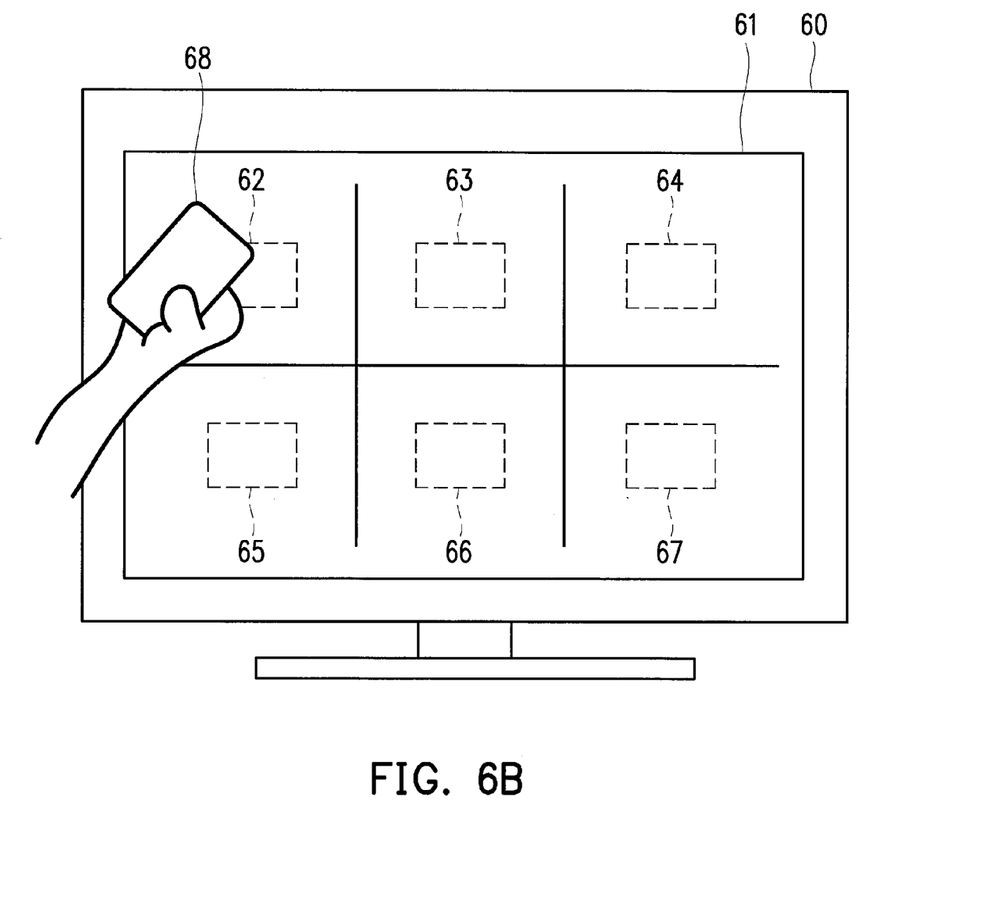

FIG. 6A and FIG. 6B are schematic diagrams illustrating a display apparatus according to an embodiment of the invention. Referring to FIG. 6A, a display apparatus 60 includes a display panel 61 and wireless communication modules 62, 63, 64, 65, 66 and 67. The display panel 61 is divided into six regions, and the wireless communication modules 62 to 67 are respectively behind the six regions. In the present embodiment, the wireless communication modules 62 to 67 are RFID tag readers. Then, referring to FIG. 6B, when the user holds a proximity card 68 with an RFID tag to approach the wireless communication module 62 (e.g., for 0 cm to 10 cm), the RFID tag of the proximity card 68 may receive a key request signal sent by the wireless communication module 62, and the RFID tag of the proximity card 68 may return an electronic key in response to the key request signal. In this way, the display apparatus 60 may execute an authorization process (e.g., a key decryption process) related to a frame content by using the received electronic key based on the frame content displayed on the region corresponding to the wireless communication module 62.

In the example illustrated in FIG. 5, FIG. 6A and FIG. 6B, each of the wireless communication modules of the display apparatus may actively send an inquiry signal, while in other examples, each of the wireless communication modules may be a passive RFID tag serving to receive the inquiry signal sent by the wireless communication apparatus.

Figure 7:
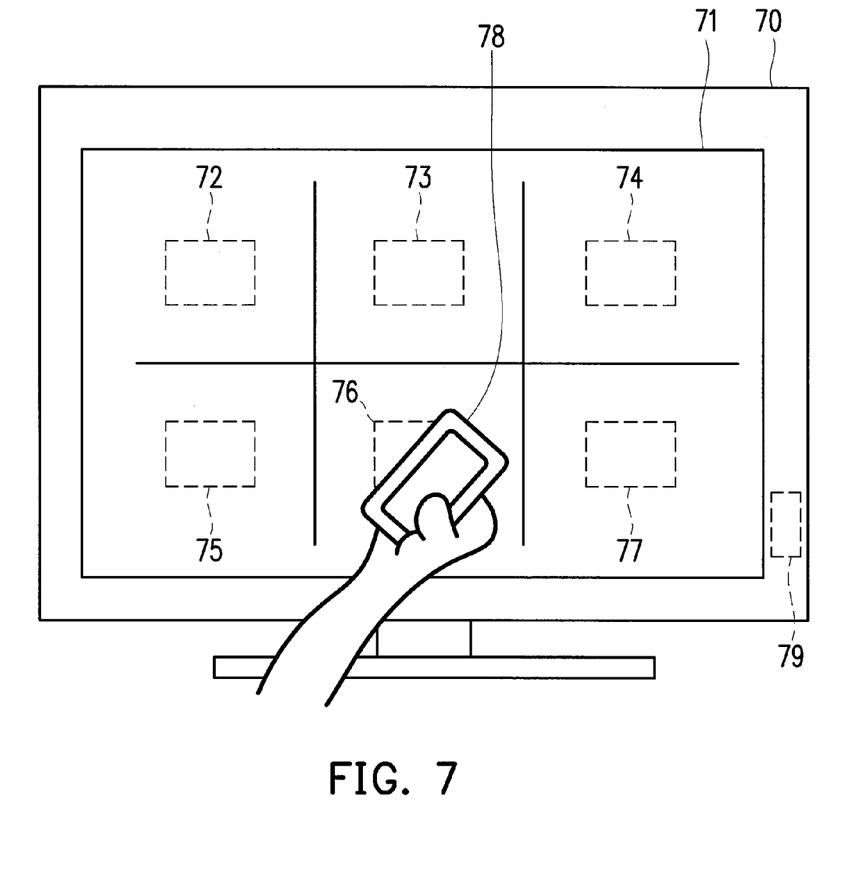
FIG. 7 is a schematic diagram illustrating a display apparatus according to an embodiment of the invention.

For instance, FIG. 7 is a schematic diagram illustrating a display apparatus according to an embodiment of the invention. A display apparatus 70 includes a display panel 71 and wireless communication modules 72, 73, 74, 75, 76, 77 and 79. The display panel 71 is divided into six regions, and the wireless communication modules 72 to 77 are respectively disposed behind the six regions. In the present example, the wireless communication modules 72 to 77 are passive RFID tags, and the wireless communication module 79 is a Bluetooth module. When the user holds a smart phone with an NFC transceiver 78 to approach the wireless communication module 76, the wireless communication module 76 may receive the inquiry signal sent by the NFC transceiver 78 of the smart phone and return an ID code. The smart phone 78 may send the ID code together with authorization data to the wireless communication module 79 of the display apparatus 70 by using the Bluetooth communication technique. After receiving the ID code and the authorization data, the display apparatus 70 may identify the wireless communication module 76 establishing the communication with the smart phone 78 according to the ID code and be aware of an authorization process (e.g., a network banking login process) corresponding to a frame displayed on the region where the wireless communication module 76 is located, such that the authorization process is executed by using the authorization data. It should be mentioned that sizes, locations and the number of the regions of the display panel in the embodiment above are merely illustrated for example, and in other embodiments, the display panel may be divided according to the demands of the manufacturer or the frame content, which is not limited in the invention.

Based on the above, in the display apparatus and the authorizing method thereof of the invention, by utilizing the penetrating effect of the electromagnetic wave at the specific working frequency, the wireless communication module operated at the specific working frequency is disposed behind the display panel to communicate with the wireless communication apparatus in front of the display panel to obtain the authorization data, and different authorization processes can be executed for the frame contents displayed on different regions. Thus, a more convenient and more secure authorization and authentication mechanism can be provided.

Although the invention has been disclosed by the above embodiments, they are not intended to limit the invention. It will be apparent to one of ordinary skill in the art that modifications and variations to the invention may be made without departing from the spirit and scope of the invention. Therefore, the scope of the invention will be defined by the appended claims.

What is claimed is:
1. A display apparatus, comprising:
a display panel, configured to display a frame;
at least one first wireless communication module, disposed behind the display panel, wherein each of the at least one first wireless communication module is operated at a working frequency capable of penetrating through the display panel to communicate with a wireless communication apparatus in front of the display panel, and the at least one first wireless communication module is disposed behind a plurality of regions of the display panel and configured to communicate with the wireless communication apparatus located in front of each of the regions;
a processor, coupled to the display panel and the at least one first wireless communication module and configured to communicate with the wireless communication apparatus by using the at least one first wireless communication module to obtain authentication data and execute an authorization process related to a content of the frame by using the received authorization data, and receive an inquiry signal sent by the wireless communication apparatus and return identification data to the wireless communication apparatus in response to the inquiry signal; and
a second wireless communication module, coupled to the processor and configured to receive the identification data and the authorization data sent by the wireless communication apparatus, wherein
the processor determines the region where the first wireless communication module communicating with the wireless communication apparatus is located according to the identification data and executes the authorization process related to the content of the frame by using the authorization data.

2. The display apparatus according to claim 1, wherein each of the at least one first wireless communication module is a near field communication (NFC) transceiver, a radio frequency identification (RFID) tag reader or an active RFID tag, wherein each of the at least one first wireless communication module sends an inquiry signal and receives the authorization data returned by the wireless communication apparatus in response to the inquiry signal.

3. The display apparatus according to claim 1, wherein the processor displays a plurality of regional frames on the regions of the display panel and based on the region where the first wireless communication module communicating with the wireless communication apparatus is located, executes the authorization process related to the content of the frame displayed on the region by using the authorization data.

4. The display apparatus according to claim 3, wherein each of the at least one first wireless communication module is a passive RFID tag.

5. The display apparatus according to claim 1, further comprising:
a network connection module, coupled to the processor and configured to connect with a server through a network and send the authorization data to the server for authorization.

6. The display apparatus according to claim 1, wherein the working frequency is 13.56 megahertz (MHz).

7. An authorizing method, adapted for a display apparatus comprising a display panel and at least one first wireless communication module disposed behind the display panel, the method comprising:
displaying a frame on the display panel;
communicating with a wireless communication apparatus located in front of the display panel to obtain authorization data by using the at least one first wireless communication module, wherein each of the at least one first wireless communication apparatus is operated at a working frequency capable of penetrating through the display panel to communicate with the wireless communication apparatus and the at least one first wireless communication module is disposed behind a plurality of regions of the display panel;
executing an authorization process related to a content of the frame by using the authorization data;
receiving an inquiry signal sent by the wireless communication apparatus by using the at least one first wireless communication module and returning identification data of the first wireless communication module receiving the inquiry signal to the wireless communication apparatus; and
receiving the identification data and the authorization data sent by the wireless communication apparatus by using a second wireless communication module and determining the region where the first wireless communication module communicating with the wireless communication apparatus is located according to the identification data and executing the authorization process related to the content of the frame by using the authorization data.

8. The authorizing method according to claim 7, wherein each of the at least one first wireless communication module is an NFC transceiver, an RFID tag reader or an active RFID tag, and the step of communicating with the wireless communication apparatus to obtain the authorization data by using the at least one first wireless communication module comprises:
sending an inquiry signal by the at least one first wireless communication module and receiving the authorization data returned by the wireless communication apparatus in response to the inquiry signal.

9. The authorizing method according to claim 7, wherein the step of executing the authorization process related to the content of the frame by using the authorization data comprises:
based on the region where the first wireless communication module communicating with the wireless communication apparatus is located, executing the authorization process related to the content of the frame by using the authorization data.

10. The authorizing method according to claim 7, wherein each of the at least one first wireless communication module is a passive RFID tag.

11. The authorizing method according to claim 7, wherein the step of executing the authorization process related to the content of the frame by using the authorization data comprises:
connecting with a server through a network and sending the authorization data to the server for authorization.

12. The authorizing method according to claim 7, wherein the working frequency is 13.56 megahertz (MHz).

* * * * *